United States Patent [19]

Hegar

[11] 4,069,218
[45] Jan. 17, 1978

[54] WATER-SOLUBLE FIBER-REACTIVE DISAZO DYESTUFFS

[75] Inventor: Gert Hegar, Schonenbuch, Switzerland

[73] Assignee: Ciba-Geigy Corporation, Ardsley, N.Y.

[21] Appl. No.: 699,120

[22] Filed: June 23, 1976

Related U.S. Application Data

[63] Continuation of Ser. No. 559,853, March 19, 1975, abandoned.

[30] Foreign Application Priority Data

Apr. 10, 1974  Switzerland .................... 5068/74

[51] Int. Cl.$^2$ .............. C09B 33/12; C09B 33/14; C09B 33/16
[52] U.S. Cl. ........................ 260/153; 260/146 D; 260/146 T; 260/154
[58] Field of Search ............ 260/146 T, 146 D, 153, 260/154

[56] References Cited

U.S. PATENT DOCUMENTS

| 2,195,784 | 4/1940 | Schmid | 260/147 |
|---|---|---|---|
| 2,467,621 | 4/1949 | Kaiser et al. | 260/153 |
| 3,895,004 | 7/1975 | deMontmollin et al. | 260/153 |

FOREIGN PATENT DOCUMENTS

| 1,193,623 | 5/1965 | Germany | 260/154 |
|---|---|---|---|
| 1,910,044 | 8/1970 | Germany | 260/153 |
| 392,732 | 10/1965 | Switzerland | 260/154 |
| 1,189,312 | 4/1970 | United Kingdom | 260/153 |
| 1,220,823 | 1/1971 | United Kingdom | 260/153 |

Primary Examiner—Charles F. Warren
Attorney, Agent, or Firm—Edward McC. Roberts; Prabodh I. Almaula; Michael W. Glynn

[57] ABSTRACT

Azo dyes of the formula

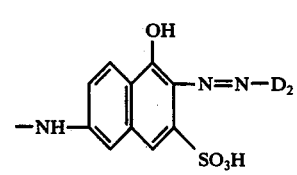

(1)

wherein each of $D_1$ and $D_2$ is a radical of a diazo component which contains at least one heterocyclic fiber-reactive radical and $D_1$ and $D_2$ together contain at least two water-solubilizing groups, and Y is the radical of an at least bifunctional acyl compound.

2 Claims, No Drawings

WATER-SOLUBLE FIBER-REACTIVE DISAZO DYESTUFFS

This is a continuation of application Ser. No. 559,853, filed Mar. 19, 1975, and now abandoned.

The invention provides azo dyes of the formula

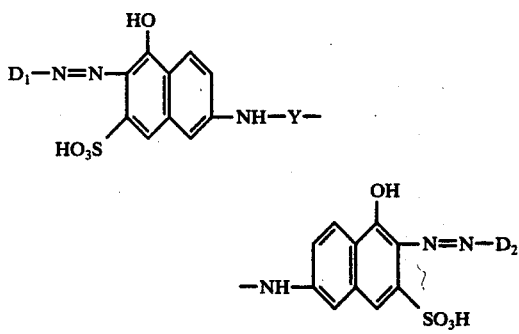

(1)

wherein each of $D_1$ and $D_2$ is radical of a diazo component which contains at least one heterocyclic fiber-reactive radical, and $D_1$ and $D_2$ together contain at least two water-solubilizing groups, and Y is the racidal of an at least bifunctional acyl compound.

The two radicals $D_1$ and $D_2$ can be the same or different and in a preferred embodiment are identical radicals.

The diazo radical $D_1$ and $D_2$ is an aromatic radical which can itself contain an azo group or which is derived from a compound of the anthraquinone, nitroaryl, phthalocyanin, stilbene or similar class. The diazo radical is in particular a radical of the benzene or napthalene class.

The water-soluble azo dyes of the formula (1) can contain more than one heterocyclic fiber-reactive radical, for example a halotriazine radical, in the radical of the diazo component $D_1$ and $D_2$. In addition to being substituted by water-sulubilizing groups, for example sulphonic acid, carboxyl or quaternized amino groups, the azo dyes can be substituted in the radical of the diazo component in the usual way by other atoms or groups of atoms, for example by halogen atoms, hydroxy, amino, alkyl, aryl, alkoxy, aryloxy, acylamino, cyano, acyl, carboalkoxy, acyloxy, nitro groups, etc. If the radical of the diazo component in ortho-position to the azo bridge contains a complex-forming group, for example a hydroxy, an amino or a carboxy group or an alkoxy group, for example a methoxy group, then the azo dyes of the formula (1) can be converted into their heavy metal complexes optionally before the introduction of fiber-reactive radicals or afterwards.

Examples of suitable complex-forming metals are iron, mangenese, nickel, copper, cobalt and chromium.

The heavy metal complexes can contain one or two molecules of azo dyes of the formula (1) bonded to one metal atom (1:1 or 1:2 complexes). But in 1:2 complexes, one of the two ligand molecules can also be an azo dye which does not correspond to the formula (1), that is to say, for example, a compound of the azobenzene type which contains corresponding complex-forming groups.

By fiber-reactive radicals are meant those groups which are able to react with the hydroxyl groups of cellulose or with the amino groups of polyamides to form a convalent chemical bond.

In the present case, such a group is in particular a heterocyclic radical containing 5 or 6 rings which is substituted by a removable atom or a removable group and is bonded through a carbonyl or sulphonyl group or a triazine or pyrimidine radical which is substituted by a removable atom or a removable group and is bonded directly through a carbon atom, or such a group contains such a radical.

The reactive radical is preferably a six-membered heterocyclic radical which is bonded through an amino group and contains halogen atoms, for example a halotriazine or a halopyrimidine radical.

In particular, the fiber-reactive radical is a radical of the formula —$N(R_1)$—Z, wherein R is a low molecular alkyl radical or preferably a hydrogen atom and Z is a 4,6-dihalogeno-s-triazinyl-(2) radical or a 4-halogeno-6-amino(alkoxy, phenoxy, alkylmercapto or arylmercapto)-s-triazinyl-(2) radical. In this context, low molecular alkyl radicals are those of up to 4 carbon atoms, e.g., methyl, ethyl, propyl, isopropyl or butyl radicals.

A suitable bridge member Y is in particular the radical of an aliphatic or aromatic dicarboxylic acid, for example oxalic acid, malonic acid, maleic acid, therephthalic acid, or also the radical of a heterocyclic acyl compound, for example a halotriazine or a halopyrimidine radical. Preferably Y is the —CO group.

Preferred azo dyes are those of the formula (1) wherein each of $D_1$ and $D_2$ is a halogeno-s-triazinylaminosulphobenzene or -disulphobenzene radical and Y is the —CO group and wherein $D_1$ and $D_2$ are identical radicals.

The azo dyes of the formula (2)

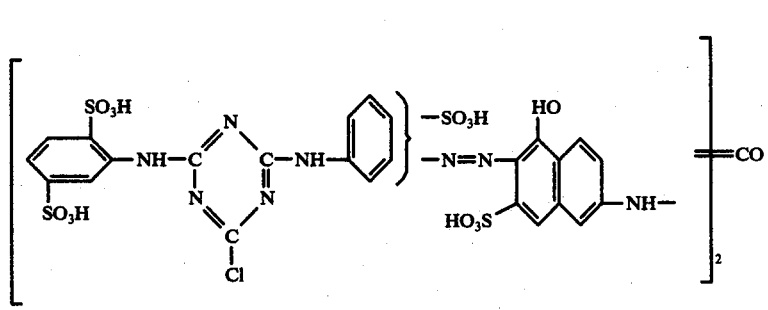

may be cited to exemplify azo dyes of the preferred embodiment.

The invention also provides a process for the manufacture of the azo dyes of the formula (1). This comprises combining 2-amino-5-hydroxy-napthalene-7-sulphonic acid, diazo components of the formulae $D_1$—$NH_2$ (3) and $D_2$—$NH_2$ (4)

as well as the at least bifunctional acyl compounds containing the radical Y in any desired sequence of the partial reactions by coupling an condensation to give the azo dyes of the formula (1).

The azo dyes of the formula (1) can be manufactured by using diazo components which already contain heterocyclic fiber-reactive groups. But in many instances it is also possible to introduce fiber-reactive groups subsequently into the azo compounds. The introduction can be effected after the coupling or after the condensation with the bifunctional acyl compound.

The introduction of the heterocyclic fiber-reactive radicals is carried out preferably by acylation of corresponding diazo components which, in addition to the amino group to be diazotized, contain a further acylatable amino group or a group which can be converted into an acylatable amino group, for example by reduction or saponification, for example the nitro group or the acetylamino group.

Examples of appropriate diazo components which are suitable for the introduction of a fiber-reactive radical are:

1,3-diaminobenzene-4,6-disulphonic acid
1,4-diaminobenzene-2-sulphonic acid
1,4-diaminobenzene-2,5- or 2,6-disulphonic acid
1,3-diamino-4-methylbenzene-6-sulphonic acid and the monoacetyl derivatives thereof.
1-amino-4-nitrobenzene
1-amino-2-chloro-4-nitrobenzene
6-acetylamino-5-chloro-2-aminophenol
6-nitro-4-methyl-2-aminophenol
4-nitro-2-aminophenol-6-sulphonic acid
6-acetylamino-1-amino-2-naphthol-4-sulphonic acid and other compounds.

Examples of aminoazo compounds into which the fibre-reactive radicals can be introduced after the coupling are the coupling products of the diazo components cited hereinabove with 2-amino-5-hydroxy-naphthalene-7-sulphonic acid.

If the fiber-reactive radical contains still further readily removable substituents, for example halogen atoms, as in the dichlorotriazine radical, then it can be condensed with compounds which contain a reactive hydrogen atom which is bonded through a heteroatom and is able to react with a removable substituent of the fiber-reactive radical to form a functional group which is bonded through the heteroatom. In this way especially a chlorine atom in the dichlorotriazine radical can be replaced by one of the corresponding radicals by reaction with ammonia, an amine, an alcohol, a phenol or mercaptan.

Instead of subsequently replacing a halogen atom in a dihalotriazine radical by an amino, alkoxy, aryloxy group or a mercapto group, it is also possible to use as fiber-reactive acylating agent a dihalotriazine which already contains an amino, alkoxy, arlyoxy or mercapto group bonded to the triazine ring.

Further important azo compounds are those of the formula (1) which contain a monohalotriazine radical which is bonded through an amino group and which in addition to the halogen atom contains an amino group bonded to the triazine ring, with a further fiber-reactive radical, especially a halotriazine radical, being bonded to this amino group. If the second, additional fiber-reactive radical is a halotriazine radical, it is bonded preferably through the radical of an alkylenediamine or arylenediamine to the first triazine radical. The fiber-reactive amino group which is present in the monohalotriazine radical in addition to the halogen atom therefore preferably has the structure

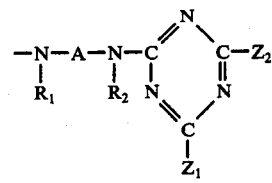

wherein $R_1$ and $R_2$ are a hydrogen atom or a low molecular alkyl radical, A is an alkylene or arylene radical, $Z_1$ is a halogen atom, e.g., a fluorine, chlorine, or bromine atom, and $Z_2$ is a halogen atom, an amino, alkoxy, aryloxy, alkylmercapto or arylmercapto group. Low molecular alkyl radicals are to be understood as meaning in this context alkyl radicals with 1 to 4 carbon atoms. A can be an alkylene radical with short or long chain, for example an ethylene or a hexylene radical; but preferably A is a benzene radical, for example a m-phenylene or p-phenylene radical, especially a phenylene-sulphonic acid radical.

Suitable alkoxy groups are radicals of primary, secondary, or tertiary alcohols, for example the methoxy, ethoxy, propyloxy, isopropoxy, or 1,1-dimethylethoxy group, radicals or etherified dialcohols, for example the ethoxy-ethoxy or methoxypropyloxy group, radicals of unsaturated aliphatic alcohols, for example the allyloxy or propargyloxy group, or radicals of aliphatic alcohols which contain cyclic groups, for example the benzyloxy, furfuryloxy or tetrahydrofurfuryloxy group. As aryloxy groups there may be cited radicals of phenols and naphthols, especially the phenoxy, sulphophenoxy or disulphophenoxy group. As alkylmercapto or arylmercapto groups there may be mentioned the methylmercapto and phenylmercapto groups.

In a particular embodiment of the invention, $Z_2$ is the chromogenic radical of the azo dyes of the formula (1).

Examples of acylating agents which contain a fiber-reactive radical are:

4,5-dichloro-1-phenylpyridazonecarboxylic or sulphonic acid chloride
4,5-dichloropyridazopropionic acid chloride
1,4-dichlorophthalazinecarboxylic or sulphonic acid chloride
2,3-dichloroquinoxalinecarboxylic or sulphonic acid chloride
2,4-dichloroquinazolinecarboxylic or sulphonic acid chloride
2-methanesulphonyl-4-chloro-6-methylpyrimidine
2,4-bis-methanesulphonyl-6-methylpyrimidine
2,4,6-trichloropyrimidine or 2,4,5,6-tetrachloropyrimidine
2,4,6-tribromopyrimidine or 2,4,5,6-tetrabromopyrimidine
2-methanesulphonyl-4,5-dichloro-6-methylpyrimidine
2,4,6-trichloro-5-bromopyrimidine
2,4,5,6-tetrafluoropyrimidine
4,6-difluoro-5-chloropyrimidine
2,4,6-trifluoro-5-chloropyrimidine
2,4,5-trifluoropyrimidine
2,4,6-trichloro-(tribromo- or trifluoro-)1,3,5-triazines, and
4,6dichloro-(dibromo- or difluoro-)1,3,5-triazines, which are substituted in 2-position by an aryl or alkyl radical, e.g., a phenyl, methyl, or ethyl radical, or by the radical of an aliphatic or aromatic mercapto compound which is bonded through the sulphur atom or of a hydroxyl compound which is bonded through the oxygen atom, or especially by a NH₂ group or by the radical of an alipahtic, heterocyclic or aromatic amino compound which is bonded through the nitrogen atom.

The acylation with the heterocyclic fiber-reactive acylating agents and the condensation with compounds which contain a reactive hydrogen atom bonded through a heteroatom are advantageously carried out with the use of acid acceptors, for example sodium carbonate or sodium hydroxide, and under such conditions that there still remain in the fiber-reactive radical of the finished product replaceable halogen atoms, unsaturated bonds or the like, i.e., these reactions are carried out for example in organic solvents or at relatively low temperatures in an aqueous medium.

Bifunctional compounds which contain the radical Y are: oxalic dichloride, chloromaleic anhydride, succinic dichloride, terephthalic dichloride, 4,5-dichloro-1-phenylpyridazone-carboxylic or -sulphonic dichloride, 2,4,6-tri- or 2,4,5,6-tetrachloro(or-bromo)-pyrimidine, 2,4,6-trichloro(tribromo or trifluoro)-1,3,5-triazines, 4,6-dichloro(dibromo or difluoro)-2-amino(alkoxy, phenoxy, alkylthio or arylthio)-1,3,5-triazines, and, especially the dichloride of carbonic acid, phosgene.

The diazodization of the diazo components of the formulae (3) and (4) is carried out by methods which are known per se, for example using hydrochloric acid and sodium nitrite. The coupling with the 2-amino-5-hydroxy-naphthalene-7-sulphonic acid is also effected by methods which are known per se in an acid to weakly alkaline medium. The condensation with the bifunctional acyl compound containing the radical Y is desirably carried out in the presence of acid acceptors.

In a preferred embodiment of the process, an intermediate of the formula

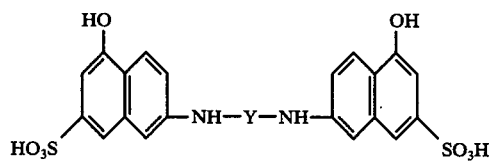

(5)

is manufactured from 2-amino-5-hydroxy-naphthalene-7-sulphonic acid and an at least bifunctional acyl compound which contains the radical Y and the diazo components of the formula (3) and (4) are coupled thereto. If $D_1$ and $D_2$ are identical radicals, the diazo component is coupled to the intermediate of the formula (5) in the molar ratio 2:1.

Preferred diazo components of the formulae (3) and (4) are halogeno-s-triasinylamino-aminobenzene-mono-sulphonic or -disulphonic acids.

The azo compounds obtained according to the present process and its different modifications (as well as their heavy metal complexes) are new; they are suitable for dyeing and printing widely different types of materials, for example, silk, leather, wool, synthetic fibers of polyamides and polyurethanes, polyhydroxylated materials, for example cellulose-containing materials of fibrous structure, such as linen, cellulose, regenerated cellulose, cotton and the like.

The non-metallized azo compounds according to the invention are particularly important dyes.

The dyes are preferably used for dyeing nitrogen-containing fibers, for example, of polyamides, polyurethanes, silk, leather and in particular wool, for example from a weakly acid, neutral or weakly alkaline bath, optionally with the addition of customary assistants, for example ethylene oxide condensation products of high molecular weight amines, and, above all for dyeing cellulose materials, in particular cotton, for example by the pad-dyeing process, in which the article is impregnated with aqueous dyestuff solutions which optionally also contain salt, and the dyestuffs are fixed after an alkali treatment or in the presence of alkali, optionally with the action of heat, and especially by the exhaustion process from a dilute liquor, from an alkaline aqueous bath which optionally contains salt.

The azo dyes are also suitable for printing, in particular on cotton, and also for printing nitrogen-containing fibers, for example wool, silk or blends containing wool.

The azo dyes of the formula (1) which contain halogeno-s-triazinyl radicals as fiber-reactive radicals are especially suitable for the exhaustion process in which they yield equally good dyeings and very good fixations with a smaller addition of salt than is usually employed.

The dyeings and prints are distinguished by interesting and useful, very bright and brilliant shades. The dyeings and prints exhibit a good stability to acids and alkalis, and a good stability to synthetic resin finishing agents, have a good fastness to light and, in particular on cotton, an outstanding fastness to wet processing. The high degree of fixation and the easy removability of non-fixed dyestuff is also deserving of mention.

In order to improve the fastness to wet processing, it is advisable to rinse the dyeings and printings obtained thoroughly with cold and hot water, optionally with the addition of an agent which has a dispersing effect and promotes the diffusion of the non-fixed material.

The following Examples illustrate the invention the parts and percentages being by weight, unless otherwise stated. The relationship of parts by weight to parts by volume is the same as that of the gram to the cm³.

EXAMPLE 1

25.3 parts of aniline-2,5-disulphonic acid are dissolved in 250 parts of water to give a neutral solution while adding sodium hydroxide solution. 18.5 parts of cyanuric chloride are added and condensation is carried out at c. 5° C, the pH of the reaction mixture being kept at 4 by addition of sodium hydroxide solution. When no more cyanuric chloride can be detected, a solution of 21 parts of the sodium salt of 1,3-phenylenediamine-4-sulphonic acid in 150 parts of water is added and the batch is warmed to 30° C. The acid which is liberated during the condensation is neutralized by addition of sodium hydroxide solution. When the condensation is terminated, diazotization is carried out in the normal way at 0° to 5° C with hydrochloric acid and sodium nitrite. The resultant diazo solution is poured with good stirring into a solution of 27.4 parts of the disodium salt of 5,5'-dihydroxydinaphth-2,2'-yl-urea-7,7'-disulphonic acid in 300 parts of water and the pH of the solution is kept at 7 to 8 during the addition. Upon termination of the coupling, the dye is isolated by sprinkling in potassium chloride. The product is filtered off and dried to yield an orange dye powder. The dye can also be isolated without the addition of salt by evaporation of the entire coupling mixture. It dyes cotton in fast, orange shades.

The following Table contains further dyes which are obtained by condensation of the amine of the column I with cyanuric chloride, subsequent condensation of the diamine of the column II diazotization and coupling to the coupling components according to the particulars of the Example. These dyes dye fibers of cellulosic material in the shades indicated in column III.

are dissolved in 500 parts of water and diazotized at 0° C by addition of 25 parts of 30% hydrochloric acid and 25 parts of 4 normal sodium nitrite solution. The diazo compound is poured into a solution of 27.4 parts of the disodium salt of 5,5'-dihydroxy-dinaphth-2,2'-yl-urea-7,7'-disulphonic acid in 300 parts of water and the coupling is brought to completion at a pH of 7.5. The dye is precipitated from the solution by the addition of common salt, filtered off and dired. It dyes cotton in fast, deep purplish red shades.

Table to Example 1

| | I | II | III |
|---|---|---|---|
| 2 | aniline-2,5-disulphonic acid | 1,4-phenylenediamine-2-sulphonic acid | red |
| 3 | " | 1,4-phenylenediamine 2,5-disulphonic acid | red |
| 4 | " | 1,4-phenylenediamine 2,6-disulphonic acid | scarlet |
| 5 | " | 1,4-phenylenediamine 2-chloro-6-sulphonic acid | red |
| 6 | 1-aminobenzene-3-sulphonic acid | 1,4-phenylenediamine-2-sulphonic acid | orange |
| 7 | 1-aminobenzene-2-sulphonic acid | " | orange |
| 8 | 1-aminobenzene-4-sulphonic acid | " | orange |
| 9 | 1-aminobenzene-2,4-di-sulphonic acid | " | orange |
| 10 | 2-amino-5-sulphobenzoic acid | 1,4-phenylenediamine-2-sulphonic acid | red |
| 11 | aniline-2,5-disulphonic acid | 4,4'diaminoazobenzene-3-sulphonic acid | red |
| 12 | " | 4,4'-diaminophenylazo-naphthalene-5'-sulphonic acid | red |
| 13 | " | 4,4'-diaminodiphenyl-azo-naphthalene-6'-sulphonic acid | red |
| 14 | " | 4,4'-diaminodiphenyl-azo-naphthalene-7'-sulphonic acid | red |

EXAMPLE 15

77.3 parts of the trisodium salt of the azo dye of the formula

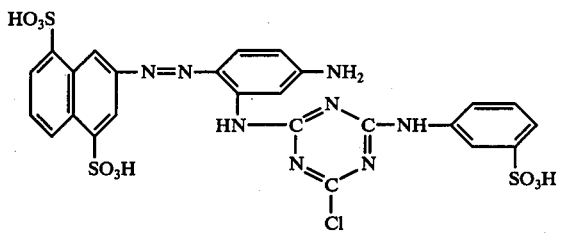

EXAMPLES 16

The prodedure of Example 1 is carried out except that 30.5 parts of terephthalic acid-di-(5,5'-dihydroxy-7,7'-disulpho)-naphthylamide are used as coupling component instead of 5,5-dihydroxy-dinaphth-2,2'-urea-7,7'-disulphonic acid. An orange dye is also obtained.

Further orange dyes are obtained by using the coupling components listed in the following Table.

| Example | Coupling Component |
|---|---|
| 17 | HO-naphthyl(HO₃S)-NH-CO-CH=CH-CO-NH-naphthyl(OH)(SO₃H) |
| 18 | HO-naphthyl(HO₃S)-NH-CO-C₆H₄-CO-NH-naphthyl(OH)(SO₃H) |
| 19 | HO-naphthyl(HO₃S)-NH-CO-thienyl-CO-NH-naphthyl(OH)(SO₃H) |

| Example | Coupling Component |
|---------|-------------------|
| 20 | ![structure with HO, Cl, OH, HO₃S, SO₃H groups on triazine-linked bis-naphthol] |
| 21 | ![structure with HO, NH-phenyl, OH, HO₃S, SO₃H groups on triazine-linked bis-naphthol] |

EXAMPLE 22

The manufacture of the diazo component and the diazotization thereof are effected according to the particulars of Example 1. The diazo solution is added dropwise to a solution of 26.1 parts of the sodium salt of 6-amino-1-naphthol-3-sulphonic acid and the pH of the coupling solution is kept at 7 by the simultaneous addition of sodium hydrogen carbonate. Upon termination of the coupling, the solution is warmed to 40° to 45° C and while keeping a neutral pH phosgene is bubbled in until no more starting dye can be detected. The dye is precipitated by sprinkling in potassium chloride, filtered off and dried. It is identical with the dye of Example 1.

EXAMPLE 23

24.6 parts of 6-acetylamino-2-aminophenol-4-sulphonic acid are diazotized in the usual way and upon termination of the diazotization the acetyl group is saponified by heating for 1 hour to 50° C in a solution of hydrochloric acid. The resultant diazo solution is combined with a solution of 27.4 parts of 5,5'-dihydroxy-dinaphth-2,2'-yl-urea-7,7'-disulphonic acid in 300 parts of water and coupling is effected at a pH of 8. Upon termination of the coupling, 100 parts by volume of normal copper sulphate solution are added and the coupling mixture is stirred for 2 hours at 50° to 60° C and a pH of 8. The violet dyestuff solution is then cooled to 0° C and treated with 18.5 parts of freshly predipitated cyanuric chloride. The acid which is liberated during the condensation is neutralized by the drop-wise addition of sodium hydroxide solution. Then 25 parts by volume of a concentrated aqueous ammonia solution are added and the batch is stirred for 3 hours at 35° to 40° C. The dye is then precipitated by sprinkling in sodium chloride. It dyes cellulose material in fast, violet shades.

EXAMPLE 24

26.8 parts of 1,4-phenylenediamine-2,5-disulphonic acid are dissolved in 300 parts of ice water at a pH of 8 while adding sodium hydroxide solution. Then 18.5 parts of cyanuric chloride are added and the mixture is stirred at 0° to 5° C, the pH being kept at 5 to 6 by the addition of sodium hydroxide solution. The resultant condensation product is then diazotized direct in the usual way by addition of 25 parts by volume of 10 normal hydrochloric acid and 50 parts by volume of 2 normal sodium nitrite solution. The resultant diazonium salt solution is neutralized by sprinkling in sodium carbonate to a pH of 6 and at the same time the temperature is kept at 0° to 5° C by addition of ice. A solution of 27.4 parts of the disodium salt of 5,5'-dihydroxy-dinaphth-2,2'-yl-urea-7,7'-disulphonic acid in 250 parts of water is added to the neutralized diazonium salt solution and the pH is kept at 7 to 7.5 until termination of the coupling. The orange solution is then treated with 25 parts by volume of a 24% aqueous ammonia solution and the reaction mixture is stirred for 3 hours at a temperature of 30° to 50° C. The dye of the formula

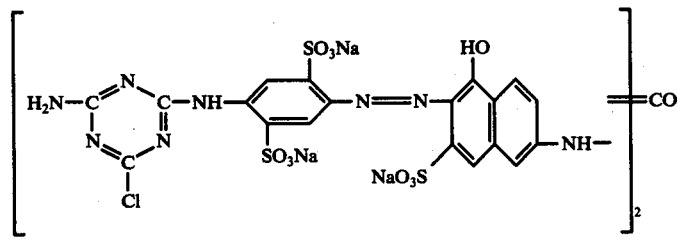

is precipitated by sprinkling common salt into the orange dyestuff solution. The precipitate is filtered off, dried and communicated to yield a reddish brown powder which dyes cotton from an aqueous solution in brown shades.

DYEING PROCEDURE I 2 parts of the dye obtained according to Example 1 are dissolved in 100 parts of water while adding 0.5 part of sodium m-nitrobenzenesulphonate. A cotton fabric is impregnated with the resultant solution to a liquor pickup of 75% and then dried.

The fabric is then impreganted with a 20° C warm solution which contains per liter 5 g of sodium hydroxide and 300 g of sodium chloride and squeezed out to a pick-up of 75%. The dyeing is steamed for 1 minute at 100° to 101° C, soaped for a quarter of an hour in a 0.3% boiling solution of an ion-free detergent, rinsed and dried.

DYEING PROCEDURE II 2 parts of the dye obtained according to Example 1 are dissolved in 100 parts of water. The solution is added to 3900 parts of cold water, 80 parts of sodium chloride are added and 100 parts of a cotton fabric are put into this dyebath.

The temperature is raised in 45 minutes to 75° C in the course of which 40 parts of trisodium phosphate are added after 30 minutes. The temperature is kept for 30 minutes at 75° C. The dyeing is rinsed and then soaped for 15 minutes in a 0.3% boiling solution of an ion-free detergent, rinsed and dried. An orange dyeing which is fast to washing and light is obtained.

PRINTING PROCEDURE

With rapid stirring, 2 parts of the dye manufactured according to Example 1 are sprinkled into a stock thickening which contains 45 parts of 5% sodium alginate thickening, 32 parts of water, 20 parts of urea, 1 part of sodium m-nitrobenzenesulphonate as well as 2 parts of sodium bicarbonate.

A cotton fabric is printed on a roller printing machine with the resultant printing paste and the printed fabric is steamed for 8 minutes at 100° C in saturated steam. The printed fabric is then thoroughly rinsed in cold and hot water.

I claim:
1. An azo dye of the formula

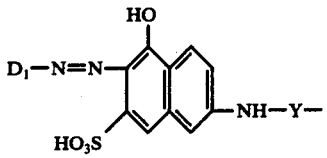

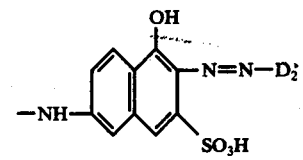

wherein
D$_1$ and D$_2$ are monosulfophenyl or disulfophenyl which are substituted by 4-chloro-6-(monosulfophenylamino, disulfophenylamino or sulfo, carboxyphenylamino)-1,3,5-triazin-(2)-ylamino; and
Y is —CO—.
2. The azo dye of the formula

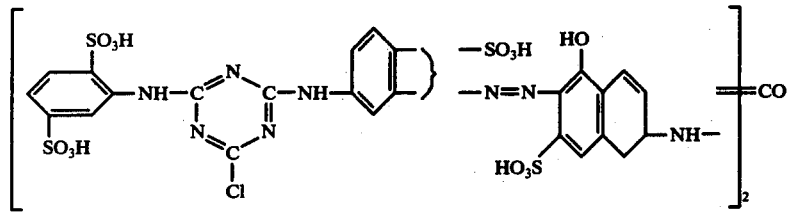

* * * * *

UNITED STATES PATENT AND TRADEMARK OFFICE
CERTIFICATE OF CORRECTION

PATENT NO. : 4,069,218

DATED : January 17, 1978

INVENTOR(S) : Gert Hegar

It is certified that error appears in the above-identified patent and that said Letters Patent are hereby corrected as shown below:

Claim 1, Column 12, between line 5 and 20

"

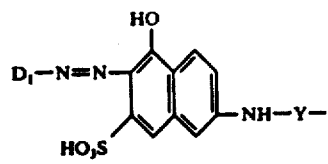

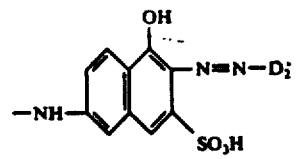

should be

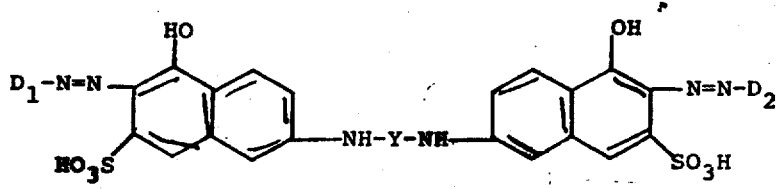

".

UNITED STATES PATENT AND TRADEMARK OFFICE
CERTIFICATE OF CORRECTION

PATENT NO. : 4,069,218
DATED : January 17, 1978
INVENTOR(S) : Gert Hegar

It is certified that error appears in the above-identified patent and that said Letters Patent are hereby corrected as shown below:

Claim 2, Column 12, between 25 and 40

" 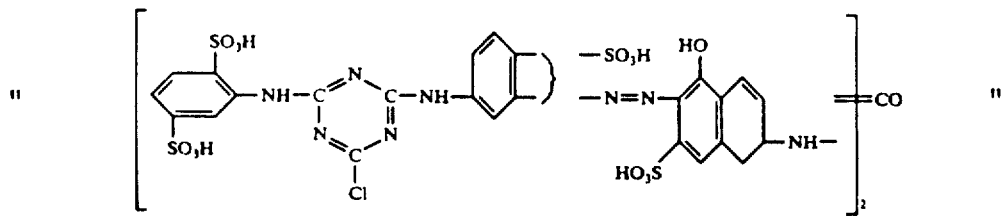 "

should be:

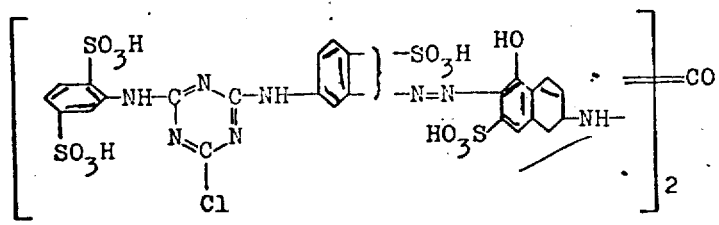

Signed and Sealed this

Twenty-fifth Day of March 1980

[SEAL]

Attest:

SIDNEY A. DIAMOND

Attesting Officer    Commissioner of Patents and Trademarks